(12) United States Patent
Hill

(10) Patent No.: US 11,994,389 B2
(45) Date of Patent: May 28, 2024

(54) ADJUSTABLE LASER LEVELING DEVICE WITH DISTANCE MEASURING LASERS AND SELF-LEVELING LASERS AND RELATED METHOD

(71) Applicant: SURE HANG, LLC, Denver, CO (US)

(72) Inventor: Jayson Hill, Denver, CO (US)

(73) Assignee: SURE HANG, LLC, Denver, CO (US)

( * ) Notice: Subject to any disclaimer, the term of this patent is extended or adjusted under 35 U.S.C. 154(b) by 0 days.

(21) Appl. No.: 17/718,102

(22) Filed: Apr. 11, 2022

(65) Prior Publication Data

US 2022/0404148 A1 Dec. 22, 2022

Related U.S. Application Data

(63) Continuation of application No. 16/315,895, filed as application No. PCT/US2016/041295 on Jul. 7, 2016, now Pat. No. 11,300,410.

(51) Int. Cl.
*G01C 15/00* (2006.01)
*G01B 11/02* (2006.01)
*G01B 11/14* (2006.01)

(52) U.S. Cl.
CPC ............ *G01C 15/004* (2013.01); *G01B 11/02* (2013.01); *G01B 11/14* (2013.01)

(58) Field of Classification Search
None
See application file for complete search history.

(56) References Cited

U.S. PATENT DOCUMENTS

| 3,771,876 | A | 11/1973 | Ljungdahl et al. | |
|---|---|---|---|---|
| 5,572,797 | A | 11/1996 | Chase | |
| 5,767,952 | A | 6/1998 | Ohtomo et al. | |
| 6,646,732 | B2 * | 11/2003 | Ohtomo | G01C 15/004 356/141.5 |
| 6,938,350 | B1 | 9/2005 | Hersey | |
| 7,237,341 | B2 * | 7/2007 | Murray | G01C 9/06 33/286 |
| 7,287,336 | B1 * | 10/2007 | Goodrich | G01C 15/12 33/286 |
| 8,943,701 | B2 | 2/2015 | Hayes et al. | |
| 9,407,364 | B2 * | 8/2016 | Dumoulin | G01C 15/008 |

(Continued)

FOREIGN PATENT DOCUMENTS

| EP | 1176429 A2 | 1/2002 |
|---|---|---|
| EP | 1872695 A2 | 1/2008 |

(Continued)

OTHER PUBLICATIONS

"Communication pursuant to Rules 70(2) and 70a(2) EPC received for EP Application No. 16908312.8 dated Apr. 9, 2020".

(Continued)

*Primary Examiner* — George B Bennett
(74) *Attorney, Agent, or Firm* — KUTAK ROCK LLP; Neil Arney; Brian L. Main

(57) ABSTRACT

A device and method for projecting visible level laser lines onto a work surface and measuring distances along the level laser lines. The device includes a self-leveling laser housing that allows the lasers to level when activated. The device also includes separate distance measuring lasers and a handheld display used to measure distances from the center of the device.

18 Claims, 10 Drawing Sheets

(56) References Cited

U.S. PATENT DOCUMENTS

| | | |
|---|---|---|
| 9,518,823 B2 | 12/2016 | Hill |
| 9,846,034 B2 | 12/2017 | Hill |
| 9,863,768 B2 * | 1/2018 | Hill ................. G01C 15/004 |
| 10,007,858 B2 * | 6/2018 | Bremer ................ G06V 10/17 |
| 11,300,410 B2 | 4/2022 | Hill |
| 2002/0008866 A1 | 1/2002 | Ohtomo et al. |
| 2004/0239914 A1 | 12/2004 | Stierle et al. |
| 2005/0005462 A1 | 1/2005 | Heger et al. |
| 2005/0111301 A1 | 5/2005 | Rickman |
| 2005/0278966 A1 | 12/2005 | Liu |
| 2006/0002233 A1 * | 1/2006 | Malard ................. G01S 15/08 367/128 |
| 2006/0059699 A1 | 3/2006 | Krantz et al. |
| 2007/0044333 A1 | 3/2007 | Qi et al. |
| 2011/0235053 A1 | 9/2011 | Campagna |
| 2012/0042527 A1 | 2/2012 | Olsen |
| 2012/0198711 A1 | 8/2012 | Hayes |
| 2013/0340268 A1 | 12/2013 | Gulunav |
| 2014/0104416 A1 * | 4/2014 | Giordano ............ G01B 11/026 348/135 |
| 2014/0352161 A1 | 12/2014 | Ranieri et al. |
| 2015/0000144 A1 | 1/2015 | Yuen et al. |
| 2015/0160009 A1 | 6/2015 | Bank |
| 2015/0204666 A1 | 7/2015 | Hill |
| 2016/0146604 A1 | 5/2016 | Metzler et al. |
| 2018/0149478 A1 * | 5/2018 | Jung .................. G01C 15/004 |
| 2019/0301863 A1 | 10/2019 | Hill |

FOREIGN PATENT DOCUMENTS

| | | |
|---|---|---|
| EP | 3482157 B1 | 10/2021 |
| WO | 2018009193 A1 | 1/2018 |

OTHER PUBLICATIONS

"Communication under Rule 71(3) EPC received for EP Patent Application Serial No. 16908312.8 dated Jun. 10, 2021.".

"European Search Report for EP 15 740 508.5, dated Sep. 20, 2017".

"Examiner's report Received for Canada Patent Application No. 3030106, dated Sep. 15, 2022.".

"Extended European Search Report for European Application No. 16908312.8 dated Mar. 23, 2020".

"Final Office Action Received for U.S. Appl. No. 16/315,895, dated Jul. 14, 2021".

"International Preliminary Report Received for PCT Application No. PCT/US2016/041295 dated Jan. 17, 2019", 15 pages.

"International Search Report and Written Opinion Received for PCT Application No. PCT/US2016/041295 dated Apr. 6, 2017".

"Non- Final Action received for U.S. Appl. No. 16/315,895, dated Dec. 30, 2020".

"Notice of Allowance received for U.S. Appl. No. 16/315,895, dated Oct. 27, 2021".

"Notice of Allowance Received for Canada Patent Application No. 3030106, dated Jul. 18, 2023.".

* cited by examiner

ADJUSTABLE LASER LEVELING DEVICE WITH DISTANCE MEASURING LASERS AND SELF-LEVELING LASERS AND RELATED METHOD

This application is a continuation application of U.S. patent application Ser. No. 16/315,895, filed Jan. 7, 2019 and now U.S. Pat. No. 11,300,410, which is the United States National Stage of Patent Cooperation Treaty Application No. PCT/US2016/041295, filed Jul. 7, 2016, the disclosures of which are incorporated herein by reference in their entireties.

FIELD

The present invention relates to a laser leveling device as generally described in U.S. Pat. No. 9,518,823, and specifically to certain improvements for the laser leveling device, namely: the use of distance measuring lasers and a self-leveling laser housing in the laser leveling device.

BACKGROUND

There are various tools on the market that utilize line lasers. However, such tools are generally limited to providing reference laser lines and require the user to move the tool and interrupt the reference lines in order to complete complex layouts. What is needed is a device to facilitate leveling and installation of objects and fixtures, such as shelving, home décor, cabinets, and tile, without moving or interrupting the device continuously. Further what is needed is a device that allows the user to make measurements along the referenced laser lines to facilitate the layouts.

SUMMARY

The following summary is provided to facilitate an understanding of some of the innovative features unique to the present invention. The present invention is not intended to be limited by this summary or any objectives conveyed herein. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

The present invention relates to a laser leveling device to facilitate leveling and installation of objects and fixtures, such as shelving, cabinets, and home décor. In a preferred embodiment, the laser leveling device has one or more bases capable of being temporarily affixed to a wall or other work surface, using known materials such as removable adhesive tabs, strips, mounting screws, nails, pins, magnets, hooks, hoop and loop, or other fasteners now known or hereinafter developed.

A preferred embodiment of this invention includes a plurality of distance measuring lasers located at predetermined angles in one or more of the bases. A base containing the plurality of distance measuring lasers is located over a predetermined reference point on a wall or other work surface (the datum point). A datum point as used herein means an initial predetermined reference point on a wall or other work surface and any other reference points identified on the wall or other work surface using the laser leveling device. By placing the laser leveling device over a datum point, a user is able to identify and mark additional points on the wall or other work surface for laying out a project. The distance measuring lasers are connected to a power source and a circuit board, or other computer processor, which includes wireless communication capability. When the distance measuring lasers are powered on, a user is able to determine the distance from the datum point using a handheld display that communicates with the distance measuring lasers using Bluetooth or other wireless communications now known in the industry or hereinafter developed. The handheld display is used to interchangeably interrupt the laser beam emitted from one of the distance measuring lasers, causing the distance from the datum point to the leading edge of the handheld display to be calculated by the computer processor for the distance measuring lasers, and then communicated to and displayed by the handheld display. The handheld display, in some embodiments is a smartphone or other mobile device with a software application and the ability to communicate wirelessly with the distance measuring lasers. When using a smartphone as the handheld display, a software application on the smartphone allows the distance measurements to be communicated to and displayed on the smartphone when the emitted laser beam from one of the distance measuring lasers is interrupted. The smartphone or mobile device, in some embodiments includes an attachment to facilitate interruption of the emitted laser beam from the distance measuring laser and marking distances on the wall or other work surface. For example, in some embodiments an adjustable sled is used for a smartphone to facilitate moving the smartphone along the beam emitted from the distance measuring laser and to interrupt the beam. The distance between the datum point at the center of the base and the leading edge of the adjustable sled containing the smartphone is displayed in real time on the smartphone.

The inclusion of distance measuring lasers allows the user to measure distances from the center of a base placed over a datum point without using a tape measure or other distance measuring tool.

In an alternative embodiment, a single distance measuring laser is rotatably attached to a base, allowing the distance measuring laser to be rotated to different angles for measuring distances from the datum point using the handheld display. In a further alternative embodiment, one or more distance measuring lasers is mounted on the laser assembly of the laser leveling device. In another embodiment, the handheld display includes other functionality such as a stud finder.

The laser leveling device of this invention includes a laser assembly that is capable of being removably and interchangeably attached to any of the plurality of bases. In a preferred embodiment, the laser assembly contains a plurality of lasers arranged at predetermined angles, including orthogonal angles, allowing laser lines to be emitted from multiple sides of the laser assembly and projected onto a wall or other work surface so that the laser lines are visible to the user.

In a preferred embodiment of the present invention, the laser assembly includes a means for leveling the lasers in the laser assembly. In the present invention, a preferred method for leveling the lasers in the laser assembly is the use of a self-leveling laser housing. However, in other embodiments, other means will be used including manual leveling of the lasers using a torpedo level. In one such preferred embodiment, the lasers are adjustably mounted to the housing. The housing is movably attachable to the top side of the laser assembly, creating a pendulum that will swing freely when the laser assembly is engaged to a base attached to a vertical work surface. The self-leveling laser housing in some embodiments will include means for balancing the self-leveling laser housing and adjusting the roll, pitch, and yaw of each of the plurality of lasers in the housing to allow the lasers to level once the laser assembly is engaged with a base on a wall or other vertical work surface. A preferred embodiment of the self-leveling laser housing also includes a prism positioned in the path of each of the plurality of lasers that causes a level, visible beam from each said laser to project as lines on the work surface.

The present invention advantageously allows level visible laser lines to be established, broadcast, and projected onto a wall or other work surface while the user makes multiple layout marks. More particularly, the present invention facilitates leveling and arrangement of objects on a wall or other work surface by allowing the user to easily measure distances from a datum point to additional points in the layout, along level, visible laser lines projected onto the work surface. Additional bases may be placed over other reference points on the work surface, which reference points originate from the initial datum point. The use of more than one base in any layout allows the laser assembly to be moved from base to base effectively and efficiently within said layout field without interrupting previously identified marks in the layout.

An alternative embodiment of the present invention is a laser leveling device with a base that is capable of being removably affixed to a wall or other work surface and one or more distance measuring lasers rotatably mounted to said the base, wherein the user is able to rotatably adjust the distance measuring lasers to orient the lasers to a desired position for measuring distances in various directions and at various angles from the center of the base.

A further alternative embodiment of the present invention is a laser assembly with one or more lasers where the laser assembly is rotatably and removably attached to a base, wherein the user is able to rotatably adjust the laser assembly on said base to orient the lasers in the laser assembly to a desired position.

In a further alternative embodiment, the laser assembly and a base are coupled together to form a single integrated device.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DESCRIPTION OF DRAWINGS

The accompanying figures are incorporated herein and form a part of the specification for the present invention and further illustrate the present invention.

DETAILED DESCRIPTION OF INVENTION

Figure 1:
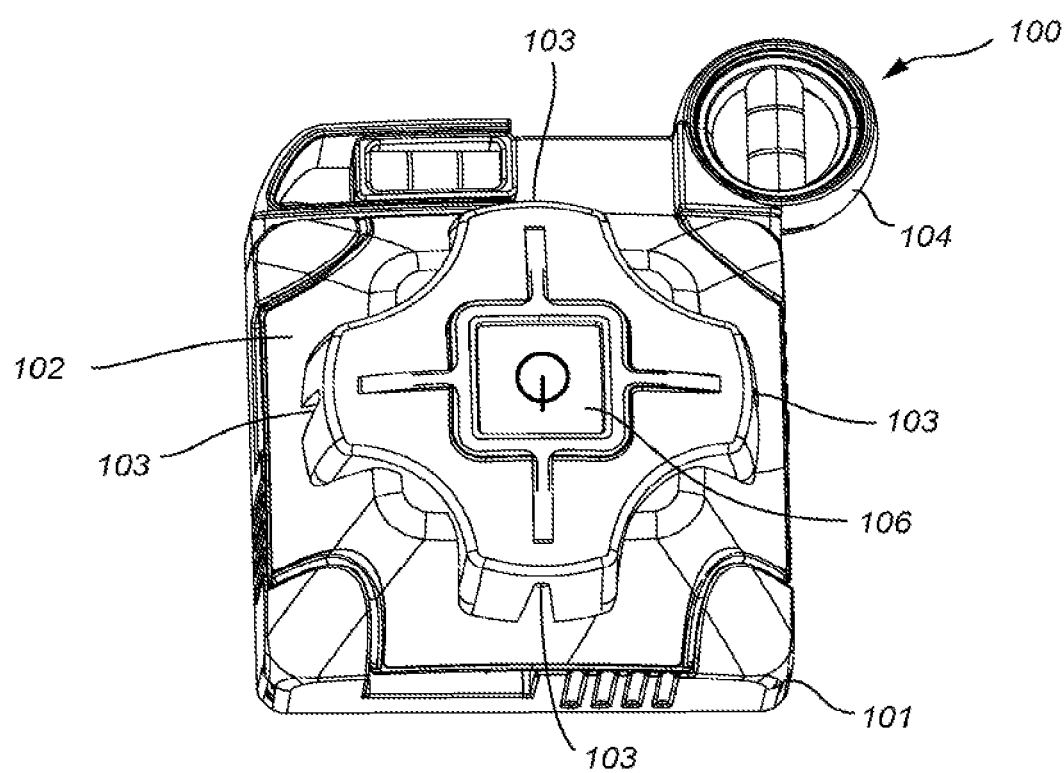
FIG. 1 is a top view of the laser leveling device, according to an embodiment of the present invention.

The present invention is best understood by reference to the drawings and description set forth herein. Embodiments of the invention are discussed below with reference to the drawings. However, those skilled in the art will readily appreciate that the detailed description given herein with respect to the drawings is for explanatory purposes as the invention extends beyond the limited embodiments described. For example, in light of the teachings of the present invention, those skilled in the art will recognize a multitude of alternate and suitable approaches, depending upon the needs of the particular application, to implement the functionality of any given detail described herein beyond the particular implementation choices in the following embodiments described and shown. Numerous modifications and variations of the invention exist, which are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number for a claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations. However, the use of such phrases should not be construed to imply a claim recitation by the indefinite articles "a" or "an" limits any particular claim containing such claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of claim recitations is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

Throughout this disclosure, examples will be provided for using the laser leveling device. However, those skilled in the art will appreciate additional applications for the laser leveling device. Uses of the present invention may relate to, for example, hanging shelving, pictures, collages, art work, closet shelving, decorative shelving, curtain rods, towel bars, fixed hang holes, tile work, cabinets, built-in cabinets/shelving, kitchen cabinets, door hardware, wall mounted lighting fixtures, flat screen TV mounts, and other installations.

The invention provides a laser leveling device characterized by one or more horizontal and/or vertical lasers integrated into a laser assembly. The lasers in the laser assembly are self-leveling and project level laser lines onto a work surface when the laser leveling device is removably attached to the work surface. The laser leveling device includes one or more bases to which the laser assembly is capable of being removably and interchangeably attached. One or more of the bases for the laser leveling device contain one or more distance measuring lasers that allow the user to measure distances from the center of the base along the laser lines projected by the laser assembly along on the work surface. Alternatively, the distance measuring lasers in some embodiments are mounted onto or within the laser assembly.

In a preferred embodiment, the laser leveling device has a plurality of bases with one or more distance measuring lasers mounted on one or more of said bases. The distance measuring lasers on said bases are connected to a power source and a circuit board, or other computer processor, which includes wireless communication capability. When a base containing the one or more distance measuring lasers is placed over a datum point and the distance measuring lasers are powered on, a user is able to determine the distance from the datum point using a handheld display that communicates with the distance measuring lasers using Bluetooth or other wireless communications now known in the industry or hereinafter developed. The handheld display is used to interchangeably interrupt the laser beam emitted from one of the distance measuring lasers, causing the distance from the datum point to the leading edge of the handheld display to be calculated by the computer processor for the distance measuring lasers, and then communicated to and displayed by the handheld display. In a preferred embodiment, the handheld display has wireless connectivity with the distance measuring lasers in one of the plurality of bases using Bluetooth or other wireless communication. The handheld display also has LCD readout for displaying measurements. In a preferred embodiment, the handheld display provides a continuous readout of distances as it is moved along the distance measuring laser. The handheld display in some embodiments is a smartphone or other mobile device with a software application for calculating and displaying distances when the laser beam emitted from a distance measuring laser is interrupted. The handheld display may also include other functions, such as a stud finder. In some embodiments, another object, device, or tool is used to interrupt the distance measuring laser, causing the distance to be displayed on the handheld device or on a separate display in close proximity to the distance measuring lasers.

In an alternative embodiment, one or more distance measuring lasers is rotatably and removably attached to a base, allowing the distance measuring device to be rotated to different angles for measuring distances from the center of said base.

In a preferred embodiment, each of the plurality of bases is capable of being removably affixed to the work surface, using known materials such as removable adhesive tabs, strips, mounting screws, nails, pins, hooks, magnets, hoop and loop, or other known fasteners. Each of the plurality of bases has a bull's-eye-like, open hole at the center, allowing the user to align each of the bases over datum points on the work surface. Alternatively, each of the bases is capable of being aligned over datum points using other means, such as magnets or sensors placed on the work surface.

In a preferred embodiment, the laser leveling device includes a laser assembly that is capable of being removably and interchangeably attached to any of the plurality of bases. Said laser assembly contains a plurality of lasers arranged at preferred angles, including orthogonal angles, allowing laser lines to be emitted out of multiple sides of the laser leveling device and projected onto a wall or other work surface. In the preferred embodiment, the lasers in the laser assembly are self-leveling. A preferred embodiment of the self-leveling lasers includes mounting the plurality of lasers in a housing that is movably attached to the top side of the laser assembly (when mounted on a base attached to a work surface), thereby creating a pendulum for the housing containing the plurality of lasers. When the laser assembly with the self-leveling laser housing is attached to a base on a work surface, the self-leveling laser housing swings freely, leveling the lasers. The self-leveling laser housing also includes means for balancing the self-leveling laser housing and adjusting roll, pitch, and yaw of the lasers mounted to the housing to ensure that the lasers will level automatically when attached to a work surface. The preferred embodiment of the self-leveling laser housing also includes a prism positioned in the path of each of the plurality of lasers mounted to the housing. The beams from each of the lasers pass through the prism causing the beams to be projected onto the work surface when the laser assembly is attached to a base mounted on the work surface.

The present invention advantageously allows level laser lines to be established, broadcast, and held on a work surface while the user makes multiple layout marks. More particularly, the present invention facilitates leveling and arrangement of objects on a wall or other work surface by allowing the user to easily move the laser assembly to a plurality of bases attached to the work surface to facilitate and expedite making multiple layout marks on the work surface and thereby successfully laying out a project.

To illustrate embodiments of the present invention, reference is made to the drawings. FIG. 1 shows a top view of a preferred embodiment of the laser leveling device 100 of the present invention and specifically shows a base 101, the laser assembly 102 with four lasers 103 installed at orthogonal angles in the laser assembly 102. FIG. 1 also shows a power button 106 for powering on one or more of the lasers 103, and a level assembly 104 that is removably attached to the base of the laser leveling device 100. In this embodiment, having four sides, a laser line is capable of being emitted from each side of the laser assembly 102 with laser lines emitted at predetermined angles, including orthogonal angles, across the wall or other work surface. In a preferred embodiment, the laser leveling device 100 includes a plurality of bases 101. The use of multiple bases 101 allows a user to expand layout possibilities by aligning the bases 101 over datum points on a work surface and then moving the laser assembly 102 from base 101 to base 101 to provide additional reference lines. In a preferred embodiment, bases 101 include openings that allow laser lines to pass through, over, and/or underneath the bases 101 for accurate alignment of the bases 101 and assistance with creating a grid of leveled laser lines on a work surface.

Figure 2:
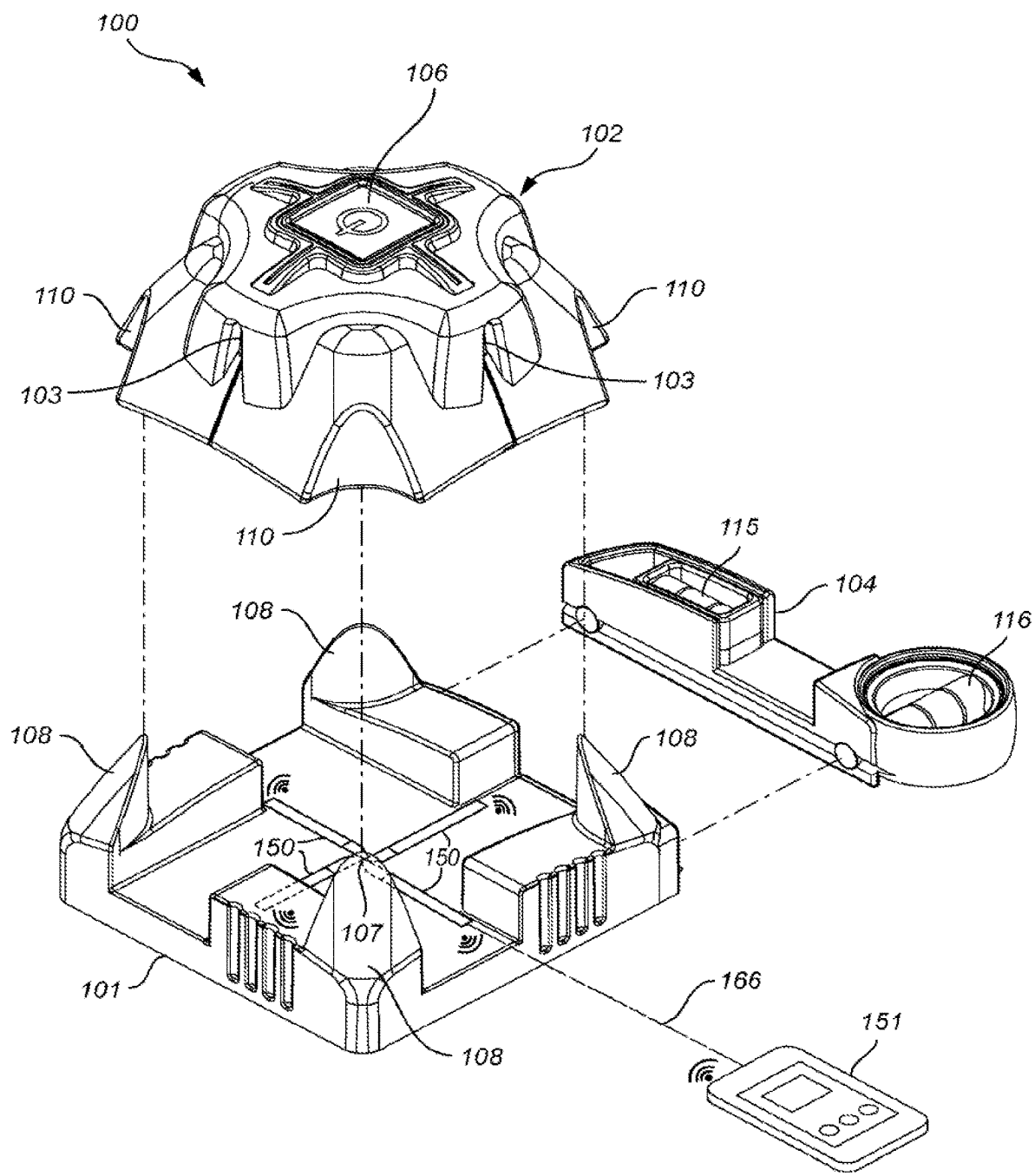
FIG. 2 is an exploded view of the laser leveling device showing the laser assembly, distance measuring lasers located near the center of the base, and the handheld display for measuring distances from the center of the base, according to an embodiment of the present invention.

FIG. 2 is a perspective, exploded view of a preferred embodiment of a laser leveling device 100 of the present invention, including a base 101, a laser assembly 102, which is removably attachable to the base 101 by aligning the corner depressions 110 to the pillars 108 on the base 101. FIG. 2 also shows a plurality of distance measuring lasers 150 located at or near the center of the base 101. The distance measuring lasers 150 are connected to a power source and a circuit board, or other computer processor, which includes wireless communication capability. The power source and circuit board are located on the base 101 with the distance measuring lasers 150, but are not shown in FIG. 2. In a preferred embodiment, the computer processor connected to the distance measuring lasers 150 calibrates the distance measuring lasers so that distances are measured from the center of the base 101 when the base 101 is located over a datum point. FIG. 2 further shows a handheld display 151 that wirelessly communicates with the plurality of distance measuring lasers 150 using Bluetooth or other means known in the art. Distances are measured from the center of the base 101 by identifying the direction in which the measurement is to be made, powering on the distance measuring laser 150 aligned in said direction and interrupting the beam emitted 166 from one of the distance measuring lasers 150 using the handheld display 151. When the beam from the distance measuring laser 150 is interrupted, the handheld display 151 will display in real time the distance from the center of the base 101. In a preferred embodiment, the distance measuring lasers 150 are not visible to the human eye, will not project onto the work surface, and will not disrupt or interfere with the visibility of the lasers 103 of the laser assembly 102, which will project onto the work surface.

FIG. 2 also shows a bull's-eye opening 107 at the center of the base 101 to facilitate locating the base 101 over a datum point. FIG. 2 also shows a laser assembly 102 with lasers 103, a power button 106 for the lasers 103 in the laser assembly 102 and corner depressions 110 for aligning and removably attaching the laser assembly 102 to the base 101. In a preferred embodiment, when the laser assembly 102 is removably attached to a base 101 that is removably mounted onto the work surface and the lasers 103 in the laser assembly 102 are activated, the lasers 103 will emit and project visible, level laser lines onto the work surface.

FIG. 2 further shows a level assembly 104, comprising a torpedo level with both horizontal 115 and vertical 116 vials for leveling the base 101 and thus the laser lines emitted from a laser assembly 102. The level assembly 104 is capable of being removably attachable to a base 101 or located adjacent to a base 101 using magnets, Velcro, or other fasteners. The level assembly 104 is capable of being used to manually level a base 101 when it is removably attached to a work surface or to level the entire laser leveling device 100 that is attached to a work surface.

Figure 3:
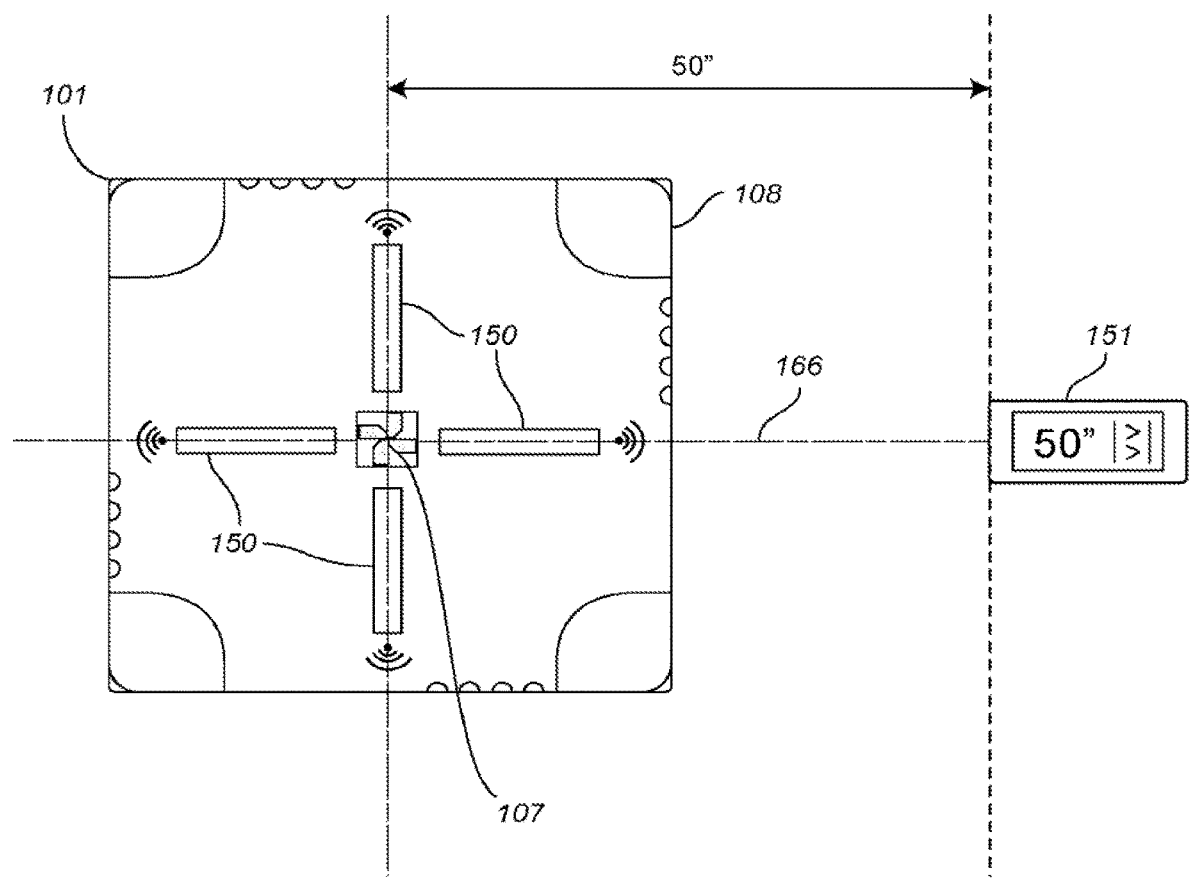
FIG. 3 is a top view of a base for the laser leveling device, showing distance measuring lasers located near the center of said base and the handheld display for measuring distances from the center of the base, according to an embodiment of the present invention.

FIG. 3 is a top view of a base 101 showing a plurality of distance measuring lasers 150 located at or near the center of the base 101. FIG. 3 also shows a bull's eye opening 107 at the center of the base 101 for positioning the base 101 over a datum point on a work surface and four pillars 108 that receive and secure the laser assembly 102 to the base 101.

Using the computer processor connected to the distance measuring lasers 150, each of the distance measuring lasers is calibrated to provide distance measurements from the center of the base 101. When the base 101 is centered over a datum point, the distance from the datum point is measured. Included with the distance measuring lasers 150 on the base 101 are electronics (not shown in FIG. 3) known to one skilled in the art such as batteries or other sources of power for the distance measuring lasers 150, a power switch, a circuit board or other computer processor, and a means for wirelessly communicating with the handheld display 151. Distances are measured from the center of the base 101 located over a datum point on the work surface by powering on the distance measuring lasers 150, selecting the desired direction for measuring distance from the center of the base 101 and interrupting the laser beam emitted 166 from the distance measuring laser 150 pointed in said direction using the handheld display 151. The handheld display has a LCD display or other similar display, other electronic components known in the art, and communicates with the distance measuring lasers 150 using Bluetooth or other means of wireless communication. When the handheld display 151 interrupts the selected distance measuring laser 150 the distance from the center of the base 101 is calculated and displayed on the LCD screen of the handheld display 151. When the handheld display 151 is moved along the emitted laser beam 166 for the selected distance measuring laser 150 the distance from the center of the base 101 will be displayed continuously and in real-time.

Figure 4:
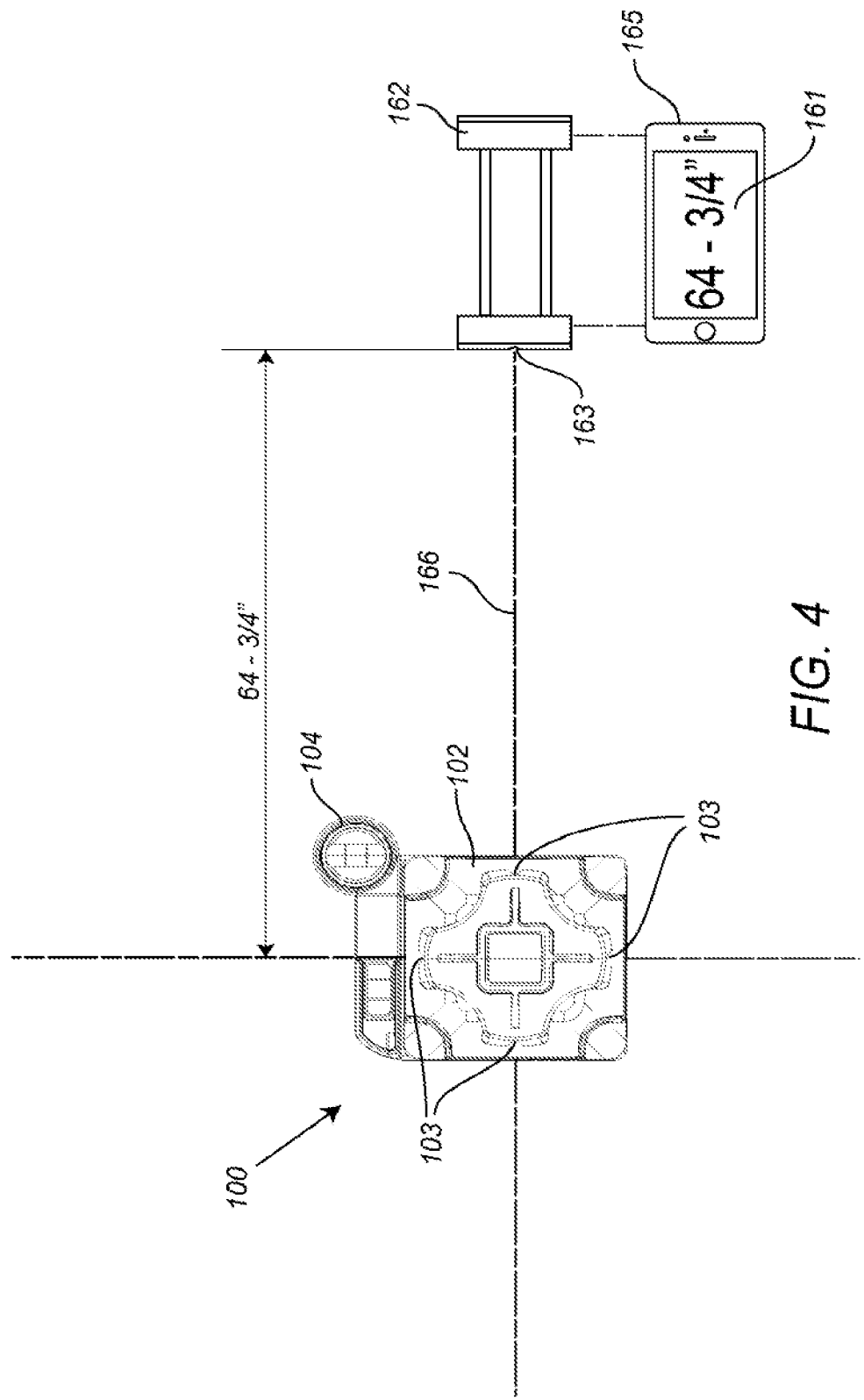
FIG. 4 is a top view of a base for the laser leveling device, showing distance measuring lasers located near the center of said base and a smartphone with attachment used for measuring distances from the center of the base, according to an embodiment of the present invention.

In an alternative embodiment, as shown in FIG. 4, the handheld display is a smartphone or other mobile device 165 that communicates by Bluetooth or other wireless means with the distance measuring lasers 150 and includes a software application 161 that allows the smartphone 165 to calibrate and display distances from the center of the base 101 when the emitted laser beam 166 is interrupted. In such embodiment, a user may attach a side rail or an adjustable cradle 162 to the smartphone 165 to facilitate interruption of the beam from one of the distance measuring lasers 150 and assist in placing marks on the work surface.

In a preferred embodiment of the present invention, the distance measuring lasers 150 are not projected onto the work surface and are not generally visible to the user. In such preferred embodiment, the distance measuring lasers 150 are installed in one or more bases 101 and are aligned on the same axes as the lasers 103 installed in the laser assembly 102. The lasers 103 in the laser assembly are projected onto the work surface and as such are visible to the user. In this preferred embodiment, the user is able to measure distances along the projected laser lines on the work surface by moving the handheld display 151 along the projected laser lines thereby interrupting the beam from the distance measuring lasers 150 that are aligned on the same axes as the laser assembly 102 lasers 103. The distance measuring lasers 150 will operate independently from the lasers 103 in the laser assembly 102. The distance measuring lasers 150 are capable of being mounted at or near the center of the base 101 on the same axes as the lasers 103 in the laser assembly 102. Alternatively, one or more distance measuring lasers 150 are capable of being rotatably mounted at or near the center of the base 101 to allow the one or more distance measuring lasers 150 to be rotatably aligned to the same axes as the lasers 103 in the laser assembly 102.

In an alternative embodiment, one or more distance measuring lasers 150 is installed on or in the laser assembly 102 and aligned on the same axes as the lasers 103 projecting onto the work surface. In this embodiment, the distance measuring lasers 150 do not necessarily require a separate power source or power button 106 and are capable of utilizing the power source and power button 106 for the laser assembly 102. In a further alternative embodiment, the handheld display 151 includes a stud finder to allow a user to identify studs in the work surface and measure the distance from the center of the base 101 to the stud. In some embodiments, an object, device, or tool, other than the handheld display, is used to interrupt the distance measuring laser, causing the distance to be displayed on the handheld device or on a separate display in close proximity to the distance measuring lasers.

Figure 5:
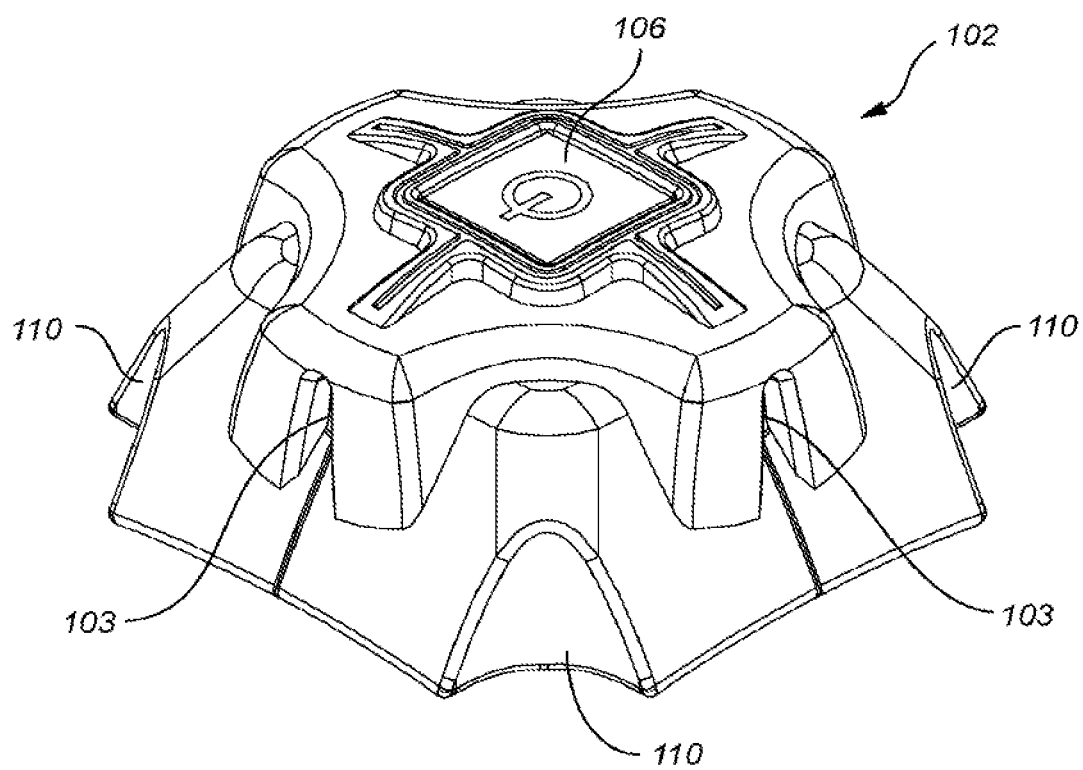
FIG. 5 is a perspective view of a laser assembly of the laser leveling device, according to an embodiment of the present invention.

FIG. 5 is a perspective view of a preferred embodiment of the laser assembly 102 of the present invention. FIG. 5 shows lasers 103 positioned at right angles in the laser assembly 102, a power button 106 for powering on and off the lasers 103 in the laser assembly 102 and corner depressions 110 for aligning and removably attaching the laser assembly 102 to a base 101.

Figure 6:
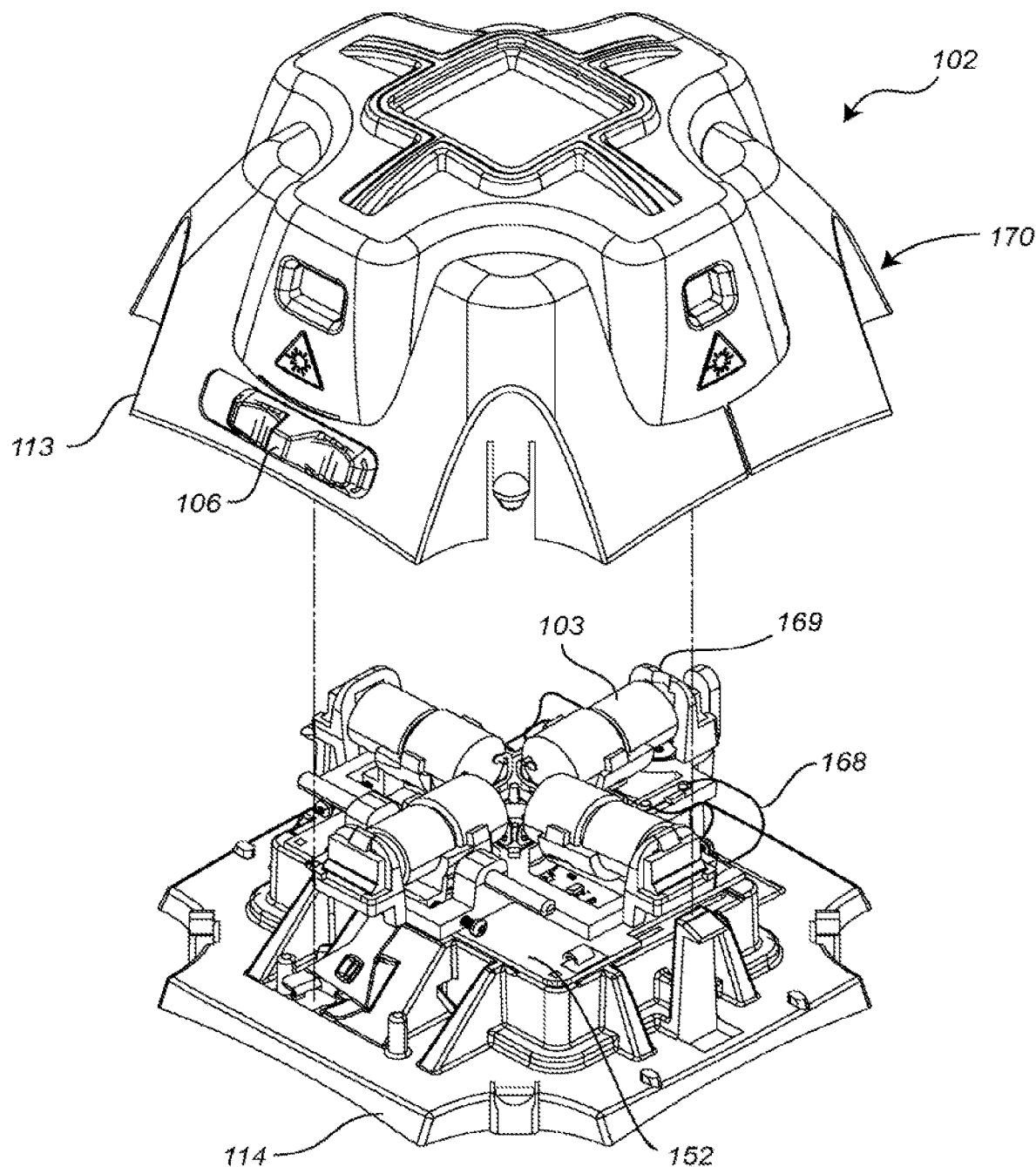
FIG. 6 is an exploded view of a laser assembly of the laser leveling device with a self-leveling laser housing and lasers, according to an embodiment of the present invention.

FIG. 6 is an exploded view of a preferred embodiment of the laser assembly 102 of the present invention, showing an upper enclosure 113 of the laser assembly 102, a plurality of lasers 103 installed on a housing 152, and a bottom enclosure 114 for the laser assembly 102. The laser assembly 102 also includes batteries or other means for powering the lasers 103 and a power button 106 for powering the lasers 103 on and off. In a preferred embodiment, the power button 106 is capable of being configured to activate an individual laser 103 or multiple lasers 103. Alternatively, there is a master power button 106 and a separate control means (e.g. circuit configuration and/or processor) for cycling to one of the plurality of laser 103 the user wishes to operate. The laser assembly 102 in some embodiments is also configured with multiple power buttons for different lasers 103. In one example, without limitation, a single click of a power button 106 enables horizontal lasers 103, a second click enables vertical lasers 103, a third click enables all lasers 103, and a subsequent click disables all lasers 103.

In a preferred embodiment of the present invention, as shown in FIG. 6, the lasers 103 in the laser assembly 102 are adjustably mounted and aligned in a self-leveling laser housing 152 that is movably attached inside the laser assembly 102 so that the top 169 of the housing 152 is at the top 170 of the laser assembly 102 when the laser assembly 102 is attached to a base 101 removably mounted onto a vertical work surface. In this embodiment, the housing 152 will swing as a pendulum when the laser assembly 102 is attached with a base 101 that is mounted on a wall or other vertical work surface. The pendulum action of the housing 152 allows the lasers 103 to self-level. FIG. 6 also shows electrical wires 168 for connecting the lasers 103 to the electrical components of the laser assembly 102, including batteries or other power source and the power button 106.

Figure 7:
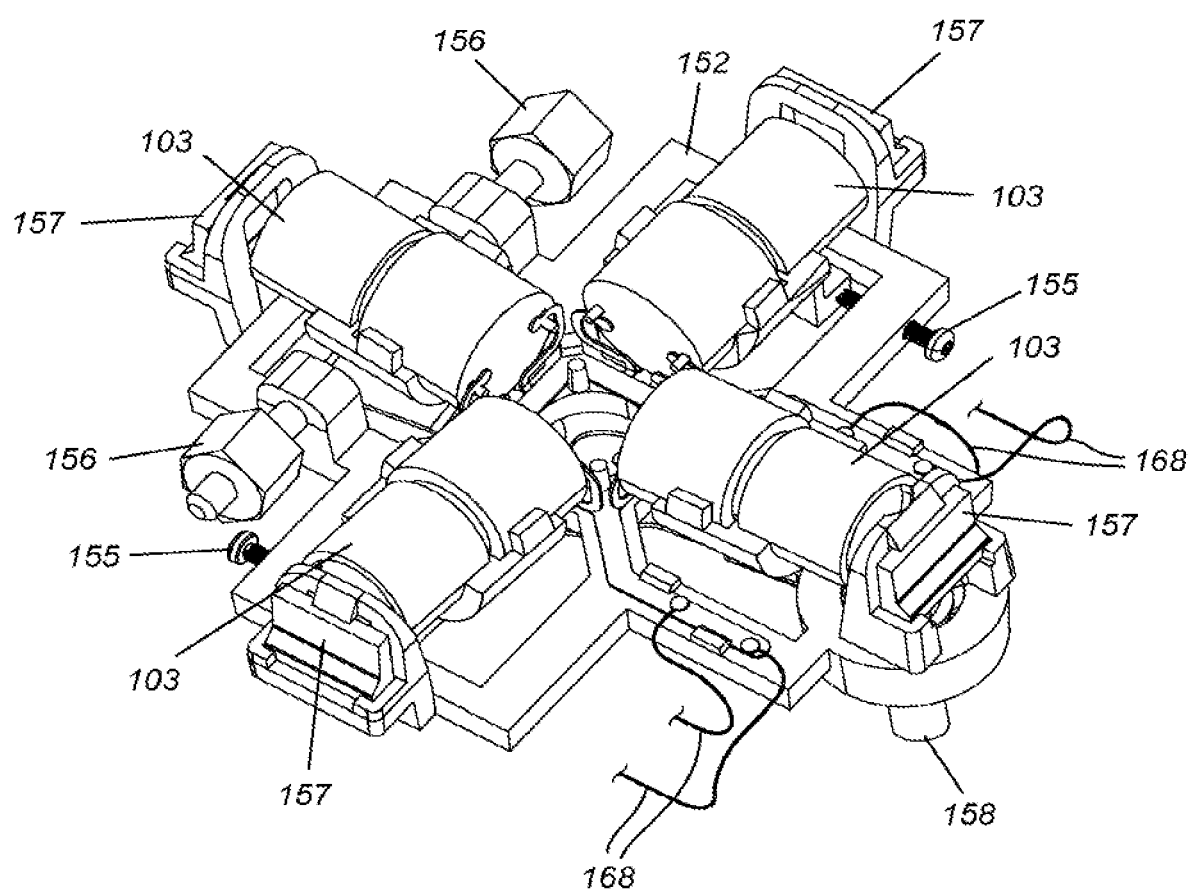
FIG. 7 is a perspective top view of a self-leveling laser housing with lasers, according to an embodiment of the present invention.
Figure 8:
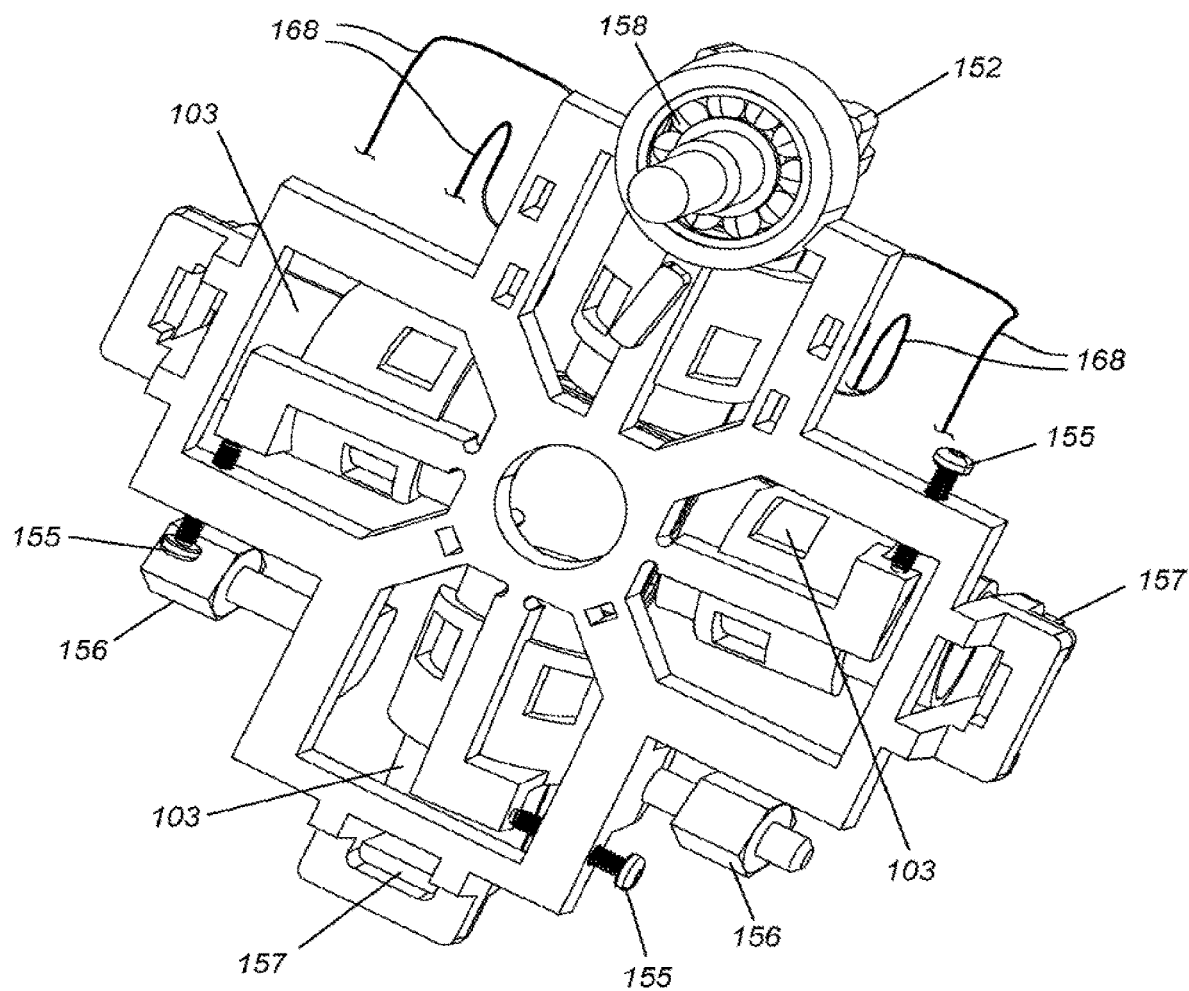
FIG. 8 is a perspective bottom view of a self-leveling laser housing with lasers, according to an embodiment of the present invention.
Figure 9:
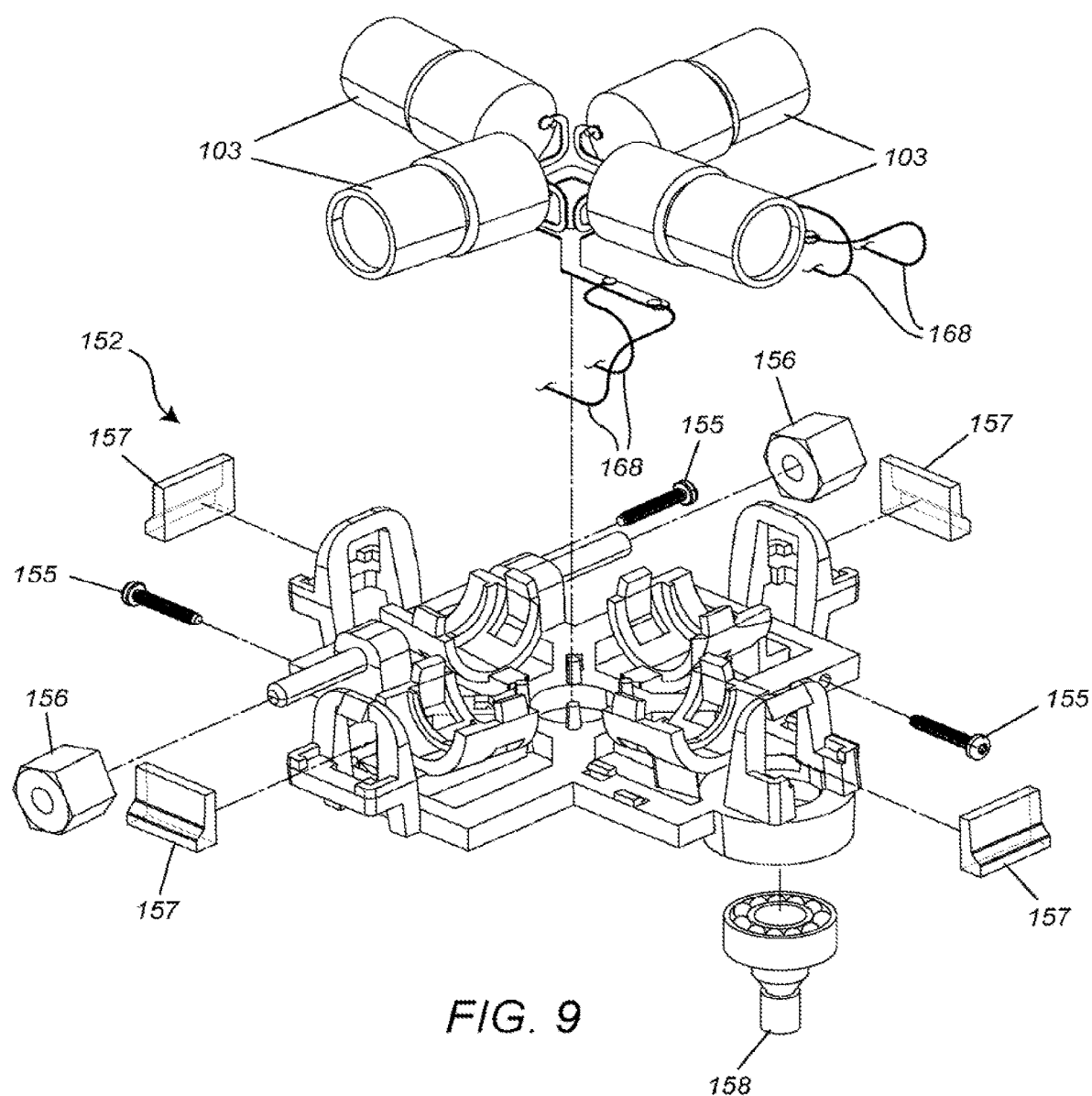
FIG. 9 is an exploded view of the self-leveling laser housing and lasers, according to an embodiment of the present invention.
Figure 10:
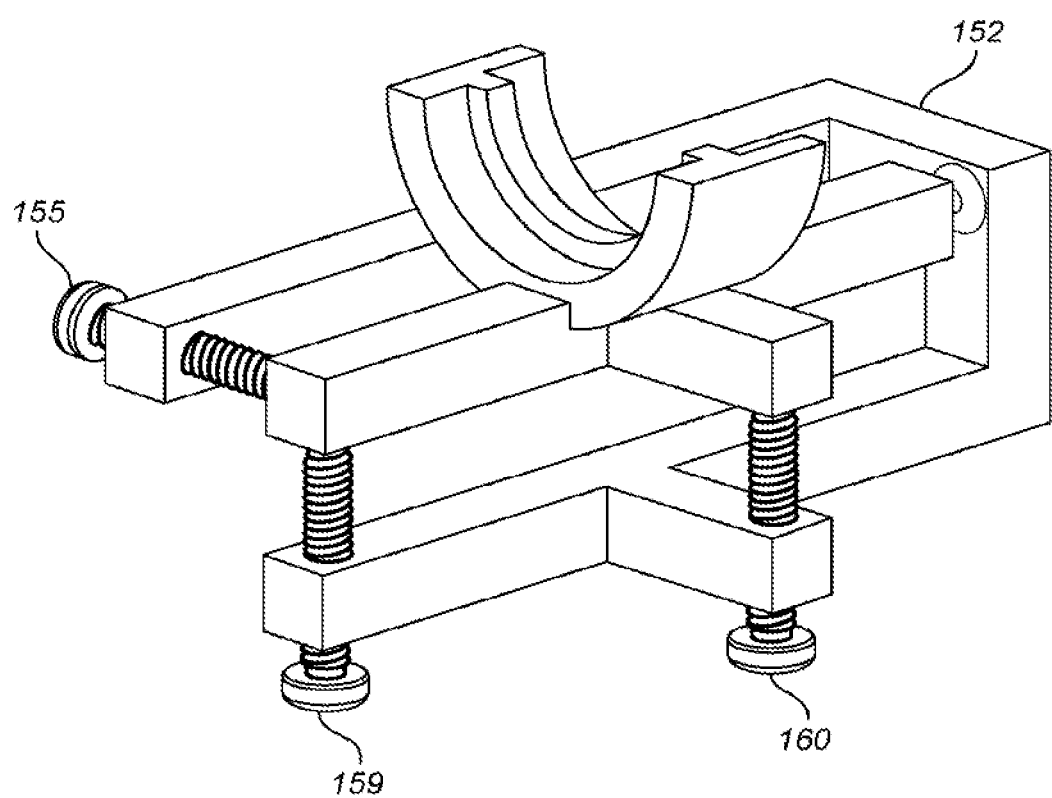
FIG. 10 is perspective view of an alternative member of the self-leveling laser housing providing for multi-axis adjustment of the pendulum.

FIGS. 7-10 show further details of the self-leveling laser housing 152 of the present invention. FIG. 7 is a top perspective view of the self-leveling laser housing 152 showing four lasers 103 mounted and aligned on the housing 152. FIG. 7 also shows a balance weight adjustment 156 for balancing the housing 152 to ensure the pendulum action of the housing 152 is properly balanced. FIG. 7 further shows screw adjustments 155 for adjusting the yaw of the mounted lasers 103. In alternative embodiments, other known means for adjusting the balance and yaw will be utilized. In a preferred embodiment, the pitch and roll of the lasers are set during assembly and are not adjustable. In an alternative embodiment, the housing 152 includes screw adjustments or other means for adjusting roll 160, pitch 159, and yaw 155 of the lasers 103 as illustrated in FIG. 10. FIG. 7 also shows electrical wires 168 for connecting the lasers 103 to the electrical components of the laser assembly 102, including batteries or other power source and the power button 106.

As shown in FIG. 7, a preferred embodiment of the present invention also includes prisms 157 located in front of each laser 103 in the laser assembly 102. The prisms 157 cause the emitted laser beams from the lasers 103 to project onto the work surface when the lasers 103 are powered on, allowing a user to see a level laser lines projected onto the work surface.

FIG. 8 is a back perspective view of the self-leveling laser housing 152, showing the pivot bearing 158 that movably attaches to the bottom enclosure 114 of the laser assembly 102, allowing the housing 152 to swing freely as a pendulum when the laser assembly 102 is attached to a base 101 that is mounted to a vertical work surface. FIG. 8 also shows the lasers 103 adjustably mounted on the housing 152, balancing weights 156 to balance the pendulum action of the housing 152, the yaw adjustments 155 for the lasers 103, and the prisms 157 mounted in front of the lasers 103.

FIG. 9 is an exploded perspective view of the self-leveling laser housing 152, showing the lasers 103, the yaw adjustments 155, the weight balance adjustments 156, the pivot bearing 158, and the prisms 157. FIG. 10 is a partial view of the self-leveling laser housing 152, which shows an alternative embodiment of the housing 152 utilizing multi-axis adjustments, including pitch adjustments 159, yaw adjustments 155, and roll adjustments 160.

In a preferred embodiment of the present invention utilizing the self-leveling laser housing 152, the laser leveling device 100 contains a master power button 106 for the laser assembly 102 and a separate button for cycling to different lasers 103 of the laser assembly 102. When the power button 106 is in the off position, the housing 152 is locked in place by a pin or similar fastener and not allowed to swing as a pendulum. When the power button 106 is moved to the on position, the housing 152 is unlocked, allowing it to swing freely as a pendulum and allowing the lasers 103 to self-level. Once the master power button 106 is turned to the on position, the separate laser cycle button is used to cycle on one or more of the lasers 103 in the laser assembly 102.

In one embodiment of the present invention, a plurality of bases 101 is utilized with one of the bases 101 arranged on the work surface near laser lines emitted from a laser assembly 102 removably attached to another of the plurality of bases 101 on the work surface. The visible, level laser lines from the laser assembly 102 pass through an opening in the base 101 or under the base 101 without being interrupted to allow for alignment of the bases 101 along the level laser lines. In other embodiments, the laser leveling device 100 comprises a plurality of bases 101 and a plurality of laser assemblies 102 whereby multiple bases 101 affixed on the work surface have laser assemblies 102 removably attached, allowing level, visible laser lines to be projected onto the work surface from more than one laser assembly 102 at a time, thereby creating a visible grid of level laser lines on the work surface to facilitate project layout.

In other embodiments, a laser assembly 102 is capable of being rotatably attached to a base 101 allowing the user to set various degrees of laser orientation from a base 101 removably attached to a work surface. For example, the center of a base 101 will rotate on ball bearings, allowing the distance measuring lasers 150 and the laser assembly 102 to rotate to different angles when attached to the base 101. In another embodiment, a base 101 includes a center disc or other means for rotating the distance measuring lasers 150 and the laser assembly 102 at various degrees around the center of the base 101. The distance measuring lasers 150 of various embodiments rotate with or separately from the laser assembly 102. When the self-leveling laser housing 152 of the present invention is used with a rotating laser assembly 102, the self-leveling laser housing 152 has a means, such as a pin or screw, for locking the housing in place once the lasers 103 are set to the preferred angle and level.

In other embodiments, the laser assembly 102 is capable of being permanently affixed to a base 101, forming an integrated laser leveling device 100. In some embodiments, the laser assembly 102 includes lasers at angles other than orthogonal angles. For example, the lasers may be provided at every 45 degrees and other common angles.

The laser leveling device 100 is capable of being configured in various sizes and shapes. However, a size and shape that can be easily lifted and moved with one hand is preferred. For example, in one embodiment, the plurality of bases 101 is rectangular with a length and width ranging between 2½ inches to approximately 5½ inches without limitation. The thickness of the base 101 in one embodiment is approximately ½ inch. A thinner base will be utilized in other embodiments to ensure the distance measuring lasers 150 are not too far removed from the work surface, advantageously increasing accuracy in measurements along the projected laser lines. In a preferred embodiment, the bases 101 and the upper enclosure 113 and bottom enclosure 114 of the laser assembly 102 are manufactured from plastic materials to provide light weight and ease of use. However, other materials will also be used in various embodiment of the invention. In a preferred embodiment, the lasers 103 are laser diodes, but other lasers will be used in various embodiments of the invention.

It is to be understood that the foregoing description is intended to illustrate and not limit the scope of the invention, which is defined by the scope of the appended claims. Other aspects, advantages, and modifications are within the scope of the following claims.

What is claimed is:

1. A laser leveling device that is configured to be removably attached to a work surface, the laser leveling device comprising:
    a laser assembly;
    a first leveling laser mounted to said laser assembly, said first leveling laser being configured to project a visible laser line onto the work surface when said first leveling laser is activated;
    a first distance measuring laser coupled to said laser assembly;
    a second leveling laser, said second leveling laser being arranged orthogonally to said first leveling laser; and
    a second distance measuring laser,
    wherein said first and second distance measuring lasers are oriented on respective first and second auxiliary axes, and
    wherein the first and second leveling lasers are oriented along respective first and second primary axes, said first and second auxiliary axes being parallel with respective first and second primary axes.

2. The laser leveling device of claim 1, further comprising a first base that is configured to be removably attached to the work surface relative to a reference point, said laser assembly being configured to selectively couple to said first base.

3. The laser leveling device of claim 2, wherein said first distance measuring laser is rotatable relative to said base such that said first distance measuring laser is rotatable relative to the reference point.

4. The laser leveling device of claim 3, wherein said first distance measuring laser is mounted to said first base such that coupling said laser assembly to said first base couples said first distance measuring laser to said laser assembly.

5. The laser leveling device of claim 2, wherein said first distance measuring laser is mounted to said first base such that coupling said laser assembly to said first base couples said first distance measuring laser to said laser assembly.

6. The laser leveling device of claim 1, wherein said laser assembly is configured to allow said first leveling laser to self-level such that the visible laser line is level.

7. The laser leveling device of claim 1, wherein said laser assembly comprises a means for adjusting pitch, roll, and yaw of said first leveling laser.

8. The laser leveling device of claim 1, further comprising a handheld device that wirelessly communicates with said first distance measuring laser and a means for wirelessly communicating with the handheld device, wherein the handheld device comprises a smartphone and an adjustable cradle for the smartphone that facilitates interruption of laser beam emitted from said first distance measuring laser, and wherein the smartphone comprises a software application for calculating and displaying distances when a laser beam emitted from said first distance measuring laser is interrupted.

9. A positioning device comprising:
 a base that is configured to be removably attached to a work surface relative to a reference point;
 a first distance measuring laser mounted on the base; and
 a handheld device that wirelessly communicates with the first distance measuring laser, said handheld device being configured to interrupt a laser beam emitted from the first distance measuring laser.

10. The positioning device of claim 9, wherein said first distance measuring laser is rotatable relative to said base such that said first distance measuring laser is rotatable relative to the reference point.

11. The positioning device of claim 9, wherein the first distance measuring laser is connected to a means for wirelessly communicating with the handheld device.

12. The positioning device of claim 9, wherein the handheld device is a smartphone with a software application for calculating and displaying distances when a laser beam emitted from the first distance measuring laser is interrupted.

13. The positioning device of claim 12, wherein the handheld device comprises a smartphone and an adjustable cradle for the smartphone that facilitates interruption of laser beams emitted from the first distance measuring laser.

14. The positioning device of claim 13, wherein the smartphone comprises a software application for calculating and displaying distances when a laser beam emitted from the first distance measuring laser is interrupted.

15. The positioning device of claim 9, further comprising a laser assembly coupled to said base so as to form an integrated laser leveling device.

16. A method for locating layout points on a work surface, the method comprising:
 removably attaching a base on the work surface relative to a first layout point;
 activating a first distance measuring laser mounted to the base, thereby causing the first distance measuring laser to emit a first laser beam;
 utilizing a handheld device to interrupt the first laser beam;
 positioning the handheld device relative to the first layout point; and
 positioning a second layout point relative to the handheld device,
 wherein the handheld wirelessly communicates with the first distance measuring laser.

17. The method of claim 16, wherein the handheld device comprises a smartphone and an adjustable cradle for the smartphone that facilitates interruption of the first laser beam.

18. The method of claim 17, wherein the smartphone comprises a software application for calculating and displaying distances when a laser beam emitted from the first distance measuring laser is interrupted.

\* \* \* \* \*